(12) United States Patent
Bütikofer

(10) Patent No.: US 8,524,807 B2
(45) Date of Patent: Sep. 3, 2013

(54) WATER SOLUBLE AMINE AND USES THEREOF

(75) Inventor: Pierre-André Bütikofer, Wallisellen (CH)

(73) Assignee: Sika Technology AG, Baar (CH)

( * ) Notice: Subject to any disclaimer, the term of this patent is extended or adjusted under 35 U.S.C. 154(b) by 201 days.

(21) Appl. No.: 12/989,662

(22) PCT Filed: Jun. 12, 2009

(86) PCT No.: PCT/EP2009/057258
§ 371 (c)(1),
(2), (4) Date: Nov. 10, 2010

(87) PCT Pub. No.: WO2009/150212
PCT Pub. Date: Dec. 17, 2009

(65) Prior Publication Data
US 2011/0166259 A1    Jul. 7, 2011

(30) Foreign Application Priority Data
Jun. 13, 2008  (EP) .................................... 08158211

(51) Int. Cl.
*C08G 59/50* (2006.01)
*C08L 63/00* (2006.01)
*C08L 79/00* (2006.01)
*B32B 27/26* (2006.01)
*B32B 27/38* (2006.01)

(52) U.S. Cl.
USPC ................ 523/401; 252/182.13; 252/182.18; 252/182.23; 523/427; 523/428; 523/429; 528/119; 528/120; 528/121; 528/123; 528/124; 528/229; 528/421

(58) Field of Classification Search
None
See application file for complete search history.

(56) References Cited

U.S. PATENT DOCUMENTS

| | | | |
|---|---|---|---|
| 4,980,398 A | 12/1990 | Chung et al. | |
| 5,116,914 A | 5/1992 | Chung et al. | |
| 5,145,568 A | 9/1992 | Chung et al. | |
| 5,194,142 A | 3/1993 | Forester | |

FOREIGN PATENT DOCUMENTS

| | | |
|---|---|---|
| EP | 0 000 605 A1 | 2/1979 |
| EP | 0 024 915 A1 | 3/1981 |
| EP | 0 567 831 A1 | 11/1993 |
| GB | 905725 | 9/1962 |

OTHER PUBLICATIONS

International Search Report issued in International Application No. PCT/EP2009/057258 on Sep. 30, 2009 (with translation).
International Preliminary Report on Patentability issued in International Application No. PCT/EP2009/057258 on Dec. 14, 2010 (with translation).

*Primary Examiner* — Michael J Feely
(74) *Attorney, Agent, or Firm* — Oliff & Berridge, PLC

(57) ABSTRACT

Compounds VB of the formula (I) or (II), said compounds being particularly suitable as curing agents for epoxide resins. The compounds can be produced easily and rapidly. They can be used in the form of aqueous curing agents and form stabile aqueous emulsions in particular. This facilitates the formulation of ECC compounds for use primarily as coatings.

19 Claims, No Drawings

US 8,524,807 B2

WATER SOLUBLE AMINE AND USES THEREOF

TECHNICAL FIELD

The present invention relates to the field of water-dilutable amines and the use thereof as hardeners for epoxy resins.

STATE OF THE ART

Amine hardeners for aqueous epoxy resin dispersions are known. They typically contain an adduct formed from polyamines and polyepoxides, which is free of epoxy groups and contains secondary and possibly primary amino groups. Often, primary amino groups present in such an adduct are converted further, since there is otherwise the disadvantage that the adduct tends to form carbonate and carbamate salts with carbon dioxide gas from the air, which can impair the quality of a hardened film in respect of esthetic and mechanical properties such as clarity, shine, surface properties, hardness and toughness.

EP 0 000 605 A1 discloses hardening compositions for aqueous epoxy resin dispersions in the form of adducts formed from polyepoxides, polyalkylene polyether polyols and polyamines. Primary amino groups of the adducts have been converted to secondary amino groups by addition onto unsaturated compounds such as acrylonitrile. These hardening compositions have the disadvantage that they tend to coagulate at temperatures in the region of 50° C., i.e. are not storage-stable.

EP 0 567 831 A1 discloses hardening compositions for aqueous epoxy resin dispersions, which are storage-stable at 50° C. The emulsifier and coemulsifier described are each adducts formed from polyamines and polyepoxides. Primary amino groups of the adducts are alkylated reductively by means of aldehydes and formic acid and are in the form of secondary amino groups. However, the hardeners described have disadvantages. Firstly, the preparation thereof is complicated, especially owing to the slowness of the reduction process used, and they secondly tend to form an esthetically unsatisfactory, hazy film when applied in a thick layer, for example as an anticorrosion coating.

EP 0 024 915 A1 discloses two-pack aqueous epoxy resin systems, the hardeners of which are present in the form of polyamine-polyepoxy resin adducts. Primary amino groups of the adducts are converted by means of monoepoxides. As a result of the reaction with monoepoxides, the preparation of the adducts described takes a very long time.

SUMMARY OF THE INVENTION

It is therefore an object of the present invention to provide compounds which are preparable in a simple rapid process from readily available raw materials, which are usable as hardeners for epoxy resins, especially as a constituent of an aqueous hardener composition for epoxy resin dispersions, and which overcome the disadvantages of the prior art.

It has been found that, surprisingly, this object is achieved by compounds as claimed in claim 1. The compounds can be used highly advantageously as hardeners for epoxy resins. More particularly, it has been found that these compounds have low viscosity, can be prepared in a simple and rapid manner from readily available raw materials and are highly suitable as hardeners for epoxy resins. They are storable substantially unchanged within a broad temperature range, have a low processing and mixing viscosity with the epoxy resin and harden rapidly and completely with the epoxy resin to develop good adhesion to the substrate. They meet the high demands on the quality of a hardened film in respect of esthetic and mechanical properties such as clarity, shine, surface properties, hardness and toughness.

It has particularly been shown that these compounds are highly suitable as aqueous hardeners for epoxy resins. More particularly, they enable the production of storage-stable, low-viscosity aqueous hardener emulsions which are stable especially up to 50° C. Thus, further aspects of the invention are a process as claimed in claim 5 for preparation of the compound and a hardener composition as claimed in claim 10.

It has additionally been found that these hardener compositions are highly suitable for two- or three-pack epoxy resin compositions as claimed in claim 16. More particularly, it is also possible to produce ECC (epoxy cement concrete) compositions. The compounds or the aqueous hardener compositions formed therefrom are especially suitable as a constituent of ECC compositions which can be used especially as a coating.

Further aspects of the present invention are a hardened composition as claimed in claim 17 and uses as claimed in claims 18 and 19.

Preferred embodiments of the invention are the subject of the dependent claims.

WAYS OF PERFORMING THE INVENTION

In a first aspect, the present invention relates to a compound VB of the formula (I) or (II)

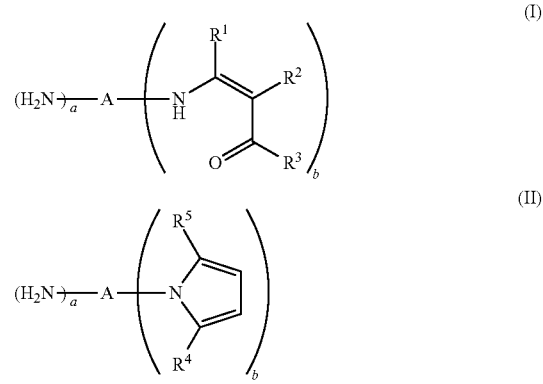

where
$R^1$ and $R^3$ are each independently an alkyl, cycloalkyl, aryl or arylalkyl group which has 1 to 12 carbon atoms and optionally has ether groups or halogen atoms, and
$R^2$ is a hydrogen atom or an alkyl, cycloalkyl, aryl or arylalkyl group having 1 to 12 carbon atoms,
or
$R^2$ and $R^1$ together are a divalent hydrocarbon radical which is part of an optionally substituted carbocyclic ring having 5 to 8 and preferably 5 or 6 carbon atoms, and $R^3$ is an alkyl, cycloalkyl, aryl or arylalkyl group which has 1 to 12 carbon atoms and optionally has ether groups or halogen atoms;
or
$R^2$ and $R^3$ together are a divalent hydrocarbon radical which is part of an optionally substituted carbocyclic ring having 5 to 8 and preferably 5 or 6 carbon atoms, and $R^1$ is an alkyl, cycloalkyl, aryl or arylalkyl group which has 1 to 12 carbon atoms and optionally has ether groups or halogen atoms;

$R^4$ and $R^5$ are each independently an alkyl, cycloalkyl, aryl or arylalkyl group which has 1 to 12 carbon atoms and optionally has ether groups or halogen atoms;

A is an (a+b)-valent radical of a polyamine-polyepoxide adduct after removal of (a+b) primary amino groups;

a is an integer from 0 to 4; and b is an integer from 1 to 4.

The following provisos apply here:

that the sum of a and b is an integer from 1 to 4, and that the parent polyepoxide of the polyamine-polyepoxide adduct is a polyepoxide E, especially a diepoxide E1, and has an epoxy equivalent weight (EEW) of 65 to 500 g/eq.

In the present document, the term "polyamine" refers to compounds having at least two primary or secondary amino groups.

In the present document, a "primary" amino group refers to an $NH_2$ group which is bonded to an organic radical, and a "secondary" amino group refers to an NH group which is bonded to two organic radicals which may also together be part of a ring.

In the present document, "molecular weight" in the case of oligomers or polymers is always understood to mean the molecular weight average $M_n$.

In the present document, the term "polyepoxide" refers to compounds having at least two epoxy groups. "Diepoxides" refer to compounds having two epoxy groups.

In the present document, "epoxy group" refers to the structural element

The bold designations such as VB, E, E1, A1, A2, A3, A4, A11, AD, AE, K1, K2, H1, H2, HW, C1, C2, C3 or the like in the present document serve merely for better readability and identification.

The acyl enamino groups of the formula (i) are in an equilibrium with the tautomeric isomers of the formula (ii) and of the formula (iii). Each mention of the acyl enamino groups of the formula (i) likewise means the tautomers of the formula (ii) and of the formula (iii), even though this is not mentioned explicitly in each case.

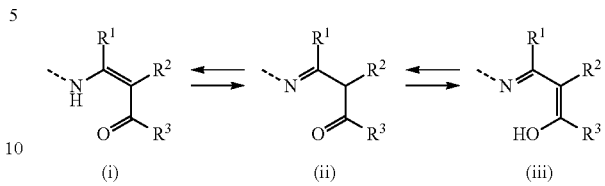

In this document, the broken lines in the formulae each represent the bond between a substituent and the rest of the corresponding molecule.

Preferably, $R^1$ and $R^3$ are each a methyl group.

Preferably, $R^2$ is a hydrogen atom.

Preferably, $R^4$ and $R^5$ are each a methyl group.

Preferably, a is 0.

Preferably, b is 1.

The polyamine-polyepoxide adduct from which A in the formulae (I) and (II) derives is free of epoxy groups and has (a+b) primary amino groups. It is an addition product of at least one polyamine A1 and optionally further amines, preferably at least one further amine A2, with at least one polyepoxide E, especially a diepoxide E1. The polyepoxide E has an epoxy equivalent weight of 65 to 500 g/eq. The polyamine A1 is preferably a polyamine having two primary amino groups. The amine A2 is preferably an amine having only one primary amino group. The polyepoxide E is preferably a diepoxide E1, more preferably a liquid diglycidyl ether of bisphenols, especially of bisphenol A.

The abbreviation "EEW" in the present document stands for "epoxy equivalent weight".

In the present document, a "glycidyl ether" refers to an ether of 2,3-epoxy-1-propanol (glycidol).

A compound VB of the formula (I) is preferably a compound VB of the formula (Ia) or (Ib). A compound VB of the formula (II) is preferably a compound VB of the formula (IIa) or (IIb).

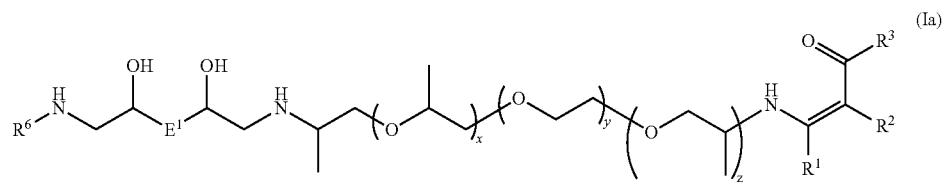

(Ia)

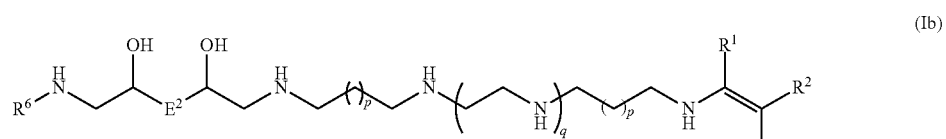

(Ib)

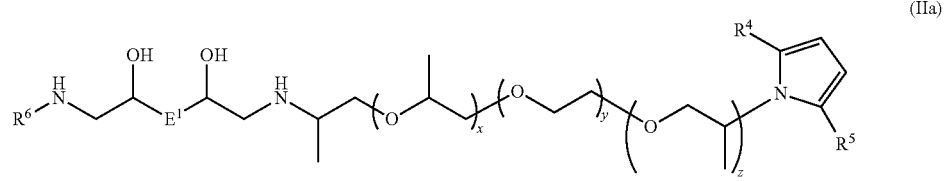

(IIa)

(IIb)

[chemical structure]

In the formulae (Ia), (Ib), (IIa) and (IIb), $R^1$, $R^2$, $R^4$ and $R^6$ are each as already defined, and $R^6$ is an alkyl or cycloalkyl or arylalkyl group which optionally has ether or secondary amino groups;

$E^1$ and $E^2$ are each independently the remainder of a diepoxide E1 having an EEW of 65 to 500 g/eq, after removal of two epoxy groups;

x is an integer from 0 to 50;

y is an integer from 0 to 100, preferably 10 to 50;

z is an integer from 1 to 50;

(x+z) is an integer from 1 to 100, preferably 1 to 10;

p is 0 or 1; and q is 0, 1, 2 or 3.

$R^6$ in the formulae (Ia), (IIa), (Ib) and (IIb) is preferably an alkyl or cycloalkyl or arylalkyl group which has at least 4 carbon atoms, especially 4 to 18 carbon atoms, and optionally has ether or secondary amino groups.

The diepoxide E1 is preferably selected from the group consisting of a bisphenol A, bisphenol F and bisphenol A/F diglycidyl ether having an epoxy equivalent weight of 156 to 250 g/eq, N,N-diglycidylaniline and a polyglycol diglycidyl ether having an epoxy equivalent weight of 170 to 340 g/eq.

The diepoxide E1 is more preferably a bisphenol. A, bisphenol F and bisphenol A/F diglycidyl ether.

Thus, $E^1$ in the formulae (Ia) and (IIa) and $E^2$ in the formulae (Ib) and (IIb) are preferably each independently the remainder of a diepoxide E1 which is selected from the group consisting of a bisphenol A, bisphenol F and bisphenol A/F diglycidyl ether having an epoxy equivalent weight of 156 to 250 g/eq, N,N-diglycidylaniline and a polyglycol diglycidyl ether having an epoxy equivalent weight of 170 to 340 g/eq, especially a bisphenol A, bisphenol F and bisphenol A/F diglycidyl ether having an epoxy equivalent weight of 156 to 250 g/eq, after removal of two epoxy groups.

The invention further provides a process for preparing a compound VB of the formula (I) or (II) as described above. In this process, (α) at least one polyamine A1 containing at least two primary amino groups, (β) optionally at least one amine A2 containing only one primary amino group, (β) at least one polyepoxide E having an epoxy equivalent weight (EEW) of 65 to 500 g/eq and (δ) at least one diketone K1 of the formula (IV) or K2 of the formula (V) are reacted with one another over more than one stage.

[chemical structure] (IV)

[chemical structure] (V)

In the formulae (IV) and (V), $R^1$, $R^2$, $R^3$, $R^4$ and $R^5$ are each as already defined.

The ratio between the number of primary amino groups and epoxy groups is especially 1.25 to 2.0. In addition, the diketone K1 or K2 is used in a ratio to the primary amino groups, which are in excess in relation to the epoxy groups, especially in an amount of 0.25 to 1.0 equivalent.

In the case that the index a in the formula (I) or (II) is different than zero, the diketone is used in a substoichiometric ratio to the primary amino groups, which are in excess in relation to the epoxy groups.

In the case that the index a in the formula (I) or (II) is zero, the diketone is used in at least a stoichiometric ratio to the primary amino groups, which are in excess in relation to the epoxy groups.

The process can be performed in such a way that, in a first stage, the polyamine A1 and optionally the amine A2 are reacted with the polyepoxide E to give an adduct AE of the formula (III), with predominant reaction of primary amino groups with the epoxy groups, while secondary amino groups and hydroxyl groups already present or formed in the course of the reaction react with epoxy groups only in an insignificant portion, if at all, owing to the significantly lower reactivity.

$$A\text{---}(NH_2)_{a+b} \quad (III)$$

In the formula (III), A, a and b are each as already defined.

In a second stage, the adduct AE of the formula (III) is subsequently reacted with the diketone K1 or K2 of the formula (IV) or (V) to give a compound VB of the formula (I) or (II), the diketone reacting with primary amino groups to eliminate water.

In the case of the diketone K1 of the formula (IV)—a β-diketone, also known as a 1,3-diketone—a compound VB of the formula (I) is formed, releasing one mole of water per mole of diketone K1 converted. This reaction proceeds very rapidly and virtually quantitatively. It is preferably performed at a temperature in the range from 20 to 120° C.

In the case of the diketone K2 of the formula (V)—a γ-diketone, also known as a 1,4-diketone—a compound VB of the formula (II) is formed, releasing two moles of water per mole of diketone K2 converted. This reaction is also known by the name "Paal-Knorr pyrrole synthesis". An intermediate (or by-product) which occurs in the formation of the compound VB of the formula (II) is the noncyclized form, as shown in the formula (II').

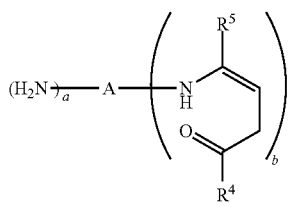
(II')

In the formula (II'), $R^4$, $R^5$, A, a and b are each as already defined.

The cyclization to the pyrrole group (condensation reaction) proceeds in a predominant portion when the reaction mixture is stirred, for example, at elevated temperature over a few hours, for example 60 to 120° C.

In addition, the process for preparing a compound VB of the formula (I) or (II) can also be performed in such a way that, in a first stage, the polyamine A1 is reacted with the diketone K1 or K2 with elimination of water to form an alkylated polyamine A11 of the formula (VI) or (VII), in which case the diketones react with primary amino groups in the manner already described.

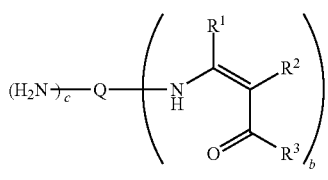
(VI)

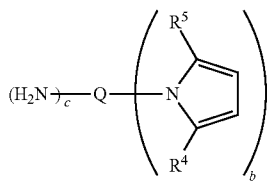
(VII)

In the formulae (VI) and (VII),
Q is the remainder of a polyamine A1 after removal of (b+c) primary amino groups;
c is 1 or 2, preferably 1;
and $R^1$, $R^2$, $R^3$, $R^4$, $R^5$ and b are each as already defined.

In a second stage, the alkylated polyamine A11 is subsequently, optionally in the presence of the amine A2, reacted with the polyepoxide E to give a compound VB of the formula (I) or (II), at least as many free primary amino groups as epoxy groups still being present in the reaction mixture.

In the processes described, the reaction of primary amino groups with epoxy groups is advantageously performed at a temperature in the range from 60 to 120° C.

The processes described can be performed as a one-pot reaction. It is thus unnecessary to purify the intermediate before the 2nd stage is carried out. The water formed in the reaction between the diketone and the primary amino groups need not be removed from the reaction mixture. It can, however, be removed from the reaction mixture if desired, for example by means of application of reduced pressure.

It is also possible to prepare a compound VB of the formula (I) by using, instead of a diketone K1 of the formula (IV), a ketone of the formula (IVa). In this case, the primary amino groups are alkylated without elimination of water.

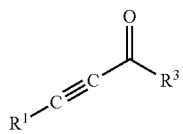
(IVa)

In the formula (IVa), $R^1$ and $R^3$ are each as already defined.

The polyamine A1 has at least two primary amino groups. In addition, it may have secondary and/or tertiary amino groups. Suitable polyamines for this purpose are especially the following:

aliphatic, cycloaliphatic or arylaliphatic diamines, especially ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonane-diamine, 1,10-decanediamine, 1,11-undecanediamine, 1,12-dodecanediamine, 1,2-, 1,3- and 1,4-diaminocyclohexane, bis(4-aminocyclohexyl)methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane (M-MECA), 1-amino-3-aminomethyl-3,5,5-trimethylcyclohexane (=isophorone-diamine or IPDA), 2- and 4-methyl-1,3-diaminocyclohexane and mixtures thereof, 1,3- and 1,4-bis(aminomethyl)cyclohexane, 2,5(2,6)-bis(amino-methyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, and 1,3- and 1,4-xylylenediamine;

aliphatic diamines containing ether groups, especially bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine and higher oligomers of these diamines, bis(3-aminopropyl)polytetrahydrofurans and polytetrahydro-furandiamines having molecular weights in the range from, for example, 350 to 5200, and polyoxyalkylenediamines. The latter are typically products from the amination of polyoxyalkylene-diols and are obtainable, for example, under the Jeffamine® name (from Huntsman), under the Polyetheramine name (from BASF) or under the PC Amine® name (from Nitroil). Especially suitable polyoxyalkylenediamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;

aliphatic, cycloaliphatic or arylaliphatic triamines, especially 4-aminomethyl-1,8-octanediamine, 1,3,5-tris(aminomethyl)benzene, 1,3,5-tris(aminomethyl)-cyclohexane, tris(2-aminoethyl)amine, tris(2-aminopropyl)amine, tris(3-aminopropyl)amine;

polyoxyalkylene triamines, which are typically products from the amination of polyoxyalkylenetriols and are obtainable, for example, under the Jeffamine® trade name (from Huntsman), under the Polyetheramine name (from BASF) or under the PC Amine® name (from Nitroil), for example Jeffamine® T-403, Jeffamine® T-3000, Jeffamine® T-5000; Polyetheramine T403, Polyetheramine T5000; and PC Amine®TA 403, PC Amine® TA 5000;

polyamines having secondary amino groups, especially what are known as polyalkyleneamines, such as diethylenetriamine (DETA), triethylenetetramine (TETA), tetraethylenepentamine (TEPA), pentaethylenehexamine (PEHA), and also polyethylenepolyamine having 5 to 7 ethyleneamine units (known as "higher ethylenepolyamine", HEPA), dipropylenetriamine (DPTA), bishexamethylenetriamine (BHMT), 3-(2-aminoethyl)aminopropylamine (N-3-amine), N,N'-bis(3-aminopropyl)ethylenediamine (N-4-amine), N3-(3-aminopentyl)-1,3-pentanediamine, N5-(3-amino-propyl)-2-methyl-1,5-pentanediamine and N5-(3-amino-1-ethylpropyl)-2-methyl-1,5-pentanediamine; such polyalkyleneamines are prepared, for example, from 1,2-dichloroethane and ammonia, or from the cyanoethylation or cyanobutylation and subsequent hydrogenation of primary polyamines;

polyamines having tertiary amino groups, especially N,N'-bis(aminopropyl)piperazine, N,N-bis(3-amino-propyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, and also the products from the double cyanoethylation and subsequent reduction of fatty amines derived from natural fatty acids, such as N,N-bis(3-aminopropyl)dodecylamine and N,N-bis(3-aminopropyl)tallowalkylamine, obtainable as Triameen® Y12D and Triameen® YT (from Akzo Nobel).

The polyamine A1 preferably has two primary amino groups.

Particularly preferred polyamines A1 are firstly ether-containing diamines of the formula (VIII), especially having a molecular weight of 500 to 5000 g/mol, preferably Jeffamine® ED-600, Jeffamine® ED-900, Jeffamine® ED-2003, and secondly polyalkyleneamines, especially DETA, TETA, TEPA, PEHA, HEPA, N3-amine and N4-amine.

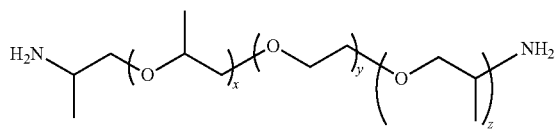

(VIII)

In the formula (VIII), x, y and z are each as already defined.

A suitable amine A2, as optionally used in part to prepare a compound VB of the formula (I) or (II), has only one primary amino group. In addition, it optionally contains secondary and/or tertiary amino groups. Suitable examples are the following amines:

aliphatic, cycloaliphatic or arylaliphatic monoamines, especially methylamine, ethylamine, 1-propylamine, 2-propylamine, 1-butylamine, 2-butylamine, tert-butylamine, 3-methyl-1-butylamine, 3-methyl-2-butylamine, cyclopentylamine, hexylamine, cyclohexylamine, octylamine, 2-ethyl-1-hexylamine, benzylamine, 1- or 2-phenylethylamine, decylamine, dodecylamine, tetradecylamine, hexadecylamine, octadecylamine, eicosylamine, docosylamine, and also fatty amines derived from natural fatty acid mixtures, for example cocoalkylamine, $C_{16}$-$C_{22}$-alkylamine, soyaalkylamine, oleylamine and tallowalkylamine, obtainable, for example, under the Armeen® (from Akzo Nobel) or Rofamin® (from Ecogreen Oleochemicals) trade names. Especially suitable fatty amines are Armeen® 12D, Armeen® 18D, Armeen® CD, Armeen® HT, Armeen® M, Armeen® OD, Armeen® OVD and Armeen® TD, and Rofamin® KD, Rofamin® LD, Rofamin® STD, Rofamin® TD, Rofamin® RD, Rofamin® TD40, Rofamin® OD80, Rofamin® OD85 and Rofamin® OD90;

aliphatic, cycloaliphatic or arylaliphatic monoamines containing ether groups, especially 2-methoxy-ethylamine, 2-ethoxyethylamine, 3-methoxypropylamine, 3-ethoxypropylamine, 3-(2-ethylhexyloxy)propylamine, 3-(2-methoxyethoxy)propylamine, 2(4)-methoxyphenylethylamine and also polyoxyalkylenemonoamines which are obtainable, for example, under the Jeffamine® trade name (from Huntsman), such as especially Jeffamine® M-600, Jeffamine® M-1000, Jeffamine® M-2005, Jeffamine® M-2070, Jeffamine® XTJ-435, Jeffamine® XTJ-436;

aliphatic, cycloaliphatic or arylaliphatic amines having one primary and at least one secondary amino group, especially N-methyl-1,2-ethanediamine, N-ethyl-1,2-ethanediamine, N-butyl-1,2-ethanediamine, N-hexyl-1,2-ethanediamine, N-butyl-1,6-hexanediamine, N-cyclohexyl-1,2-ethanediamine, 4-aminomethyl-piperidine, 3-(4-aminobutyl)piperidine, N-(2-amino-ethyl)piperazine (N-AEP), N-(2-aminopropyl)-piperazine, diamines from the cyanoethylation or cyanobutylation and subsequent hydrogenation of primary monoamines, for example N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentyl-amine, 3-butylamino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, and additionally diamines obtainable by cyanoethylation and subsequent reduction of fatty amines, such as N-cocoalkyl-1,3-propanediamine, N-oleyl-1,3-propanediamine, N-soyaalkyl-1,3-propane-diamine, N-tallowalkyl-1,3-propanediamine or N—($C_{16-22}$-alkyl)-1,3-propanediamine, obtainable, for example, as Duomeen® CD, Duomeen® M, Duomeen® O, Duomeen® OV and Duomeen® T (Akzo Nobel), and additionally triamines and tetramines derived from fatty amines, such as cocoalkyldipropylenetriamine, oleyldipropylenetriamine, tallowalkyldipropylene-triamine, oleyltripropylenetetramine and tallowalkyltripropylenetetramine, obtainable, for example, as Triameen® C, Triameen® OV, Triameen® T, Tetrameen® OV and Tetrameen® T (Akzo Nobel);

aliphatic, cycloaliphatic or arylaliphatic amines having one primary and at least one tertiary amino group, especially N,N-diethyl-1,2-ethanediamine, N,N-dimethyl-1,3-propanediamine, N,N-diethyl-1,3-propanediamine and N,N-diethyl-1,4-pentanediamine.

Preferred amines A2 contain at least 4 carbon atoms, especially 4 to 18 carbon atoms, and optionally have ether or secondary amino groups.

Particularly preferred amines A2 are amines which are selected from the group consisting of butylamine, pentylamine, hexylamine, cyclohexylamine, octylamine, decylamine, dodecylamine, tetradecylamine, hexadecylamine, octadecylamine, eicosylamine, docosylamine, 2-ethyl-1-hexylamine, benzylamine, 1- or 2-phenylethylamine, N-hexyl-1,2-ethanediamine, N-(2-ethylhexyl)-1,2-ethanediamine, N-cyclohexyl-1,2-ethanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, cocoalkylamine, soyaalkylamine, oleylamine, N-cocoalkyl-1,3-propanediamine, N-oleyl-1,3-propanediamine and N-soyaalkyl-1,3-propanediamine.

The polyepoxide E has an epoxy equivalent weight (EEW) of 65 to 500 g/eq. Polyepoxides E can be prepared in a known manner, for example from the oxidation of the corresponding olefins or from the reaction of epichlorohydrin with the corresponding polyols, polyphenols or amines.

Especially suitable as polyepoxides E are what are known as polyepoxide liquid resins, referred to hereinafter as "liquid resin". They have a glass transition temperature which is typically below 25° C., in contrast to solid polyepoxide resins which can be comminuted to powders which are pourable at 25° C. and have a glass transition temperature above 25° C. Polyepoxides which are known to the person skilled in the art as reactive diluents are also referred to in the present document as liquid resins.

In one embodiment, the polyepoxide E is an aromatic polyepoxide. Suitable examples for this purpose are liquid resins of the formula (IX)

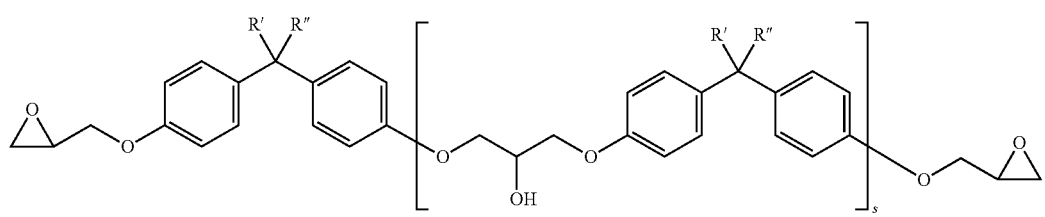

where R' and R" are each independently a hydrogen atom or a methyl group, and s has an average value of 0 to 1. Preference is given to those liquid resins of the formula (IX) in which the index s has an average value of less than 0.2.

The liquid resins of the formula (IX) are diglycidyl ethers of bisphenol A, bisphenol F and bisphenol A/F, where A represents acetone and F formaldehyde, which serve as reactants for preparation of these bisphenols. A bisphenol A liquid resin accordingly has methyl groups, a bisphenol F liquid resin hydrogen atoms, and a bisphenol A/F liquid resin both methyl groups and hydrogen atoms, as R' and R" in formula (IX). In the case of bisphenol F, it is also possible for positional isomers to be present, especially derived from 2,4'- and 2,2'-hydroxyphenylmethane.

Such liquid resins are commercially available, for example as Araldite® GY 204, Araldite® GY 250, Araldite® GY 260, Araldite® GY 281, Araldite® GY 282, Araldite® GY 285, Araldite® PY 304, Araldite® PY 720 (from Huntsman); D.E.R.® 330, D.E.R.® 331, D.E.R.® 332, D.E.R.® 336, D.E.R.® 354, D.E.R.® 351, D.E.R.® 352, D.E.R.® 356 (from Dow); Epikote® 162, Epikote® 827, Epikote® 828, Epikote® 158, Epikote® 862, Epikote® 169, Epikote® 144, Epikote® 238, Epikote® 232, Epikote® 235 (from Hexion), Epalloy® 7190, Epalloy® 8220, Epalloy® 8230, Epalloy® 7138, Epalloy® 7170, Epalloy® 9237-70 (from CVC), Chem Res® E 20, Chem Res® E 30 (from Cognis), Beckopox® EP 116, Beckopox® EP 140 (from Cytec).

Further suitable aromatic polyepoxides E are the glycidylization products of dihydroxybenzene derivatives such as resorcinol, hydroquinone and catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxy-phenyl)propane, 2,2-bis(4-hydroxy-3-tert-butyl-phenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)-heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenyl-ethane, 1,4-bis[2-(4-hydroxyphenyl)-2-propyl]benzene) (bisphenol P), 1,3-bis[2-(4-hydroxyphenyl)-2-propyl]benzene) (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl)ether, bis(4-hydroxyphenyl) sulfone;

condensation products of phenols with formaldehyde, which are obtained under acidic conditions, such as phenol novolacs or cresol novolacs;

aromatic amines, such as aniline, toluidine, 4-aminophenol, 4,4'-methylenediphenyldiamine (MDA), 4,4'-methylenediphenyldi(N-methyl)amine, 4,4'-[1,4-phenylenebis(1-methylethylidene)]bisaniline (bisaniline P), 4,4'-[1,3-phenylenebis(1-methylethylidene)]bisaniline (bisaniline M).

Commercially available epoxy novolacs are, for example, Araldite® EPN 1179, Araldite® GY 289, Araldite® PY 307-1 (from Huntsman), D.E.N.® 425 and D.E.N.® 431 (from Dow), Epalloy® 8240 and Erisys® RF50 (from CVC); a commercially available N,N-diglycidylaniline is, for example, Epikote® Resin 493 (from Hexion); a commercially available resorcinol diglycidyl ether is, for example, Erisys® RDGE (from CVC).

In a further embodiment, the polyepoxide E is an aliphatic or cycloaliphatic polyepoxide, for example diglycidyl ether;

a glycidyl ether of a saturated or unsaturated, branched or unbranched, cyclic or open-chain $C_2$ to $C_{30}$ diol, for example ethylene glycol, propylene glycol, butylene glycol, hexanediol, octanediol, a polypropylene glycol, dimethylolcyclohexane, neopentyl glycol;

a glycidyl ether of a tri- or tetrafunctional, saturated or unsaturated, branched or unbranched, cyclic or open-chain polyol such as castor oil, trimethylolpropane, trimethylolethane, penta-erythritol, sorbitol or glycerol, and alkoxylated glycerol or alkoxylated trimethylolpropane;

a hydrogenated bisphenol A, F or A/F liquid resin, or the glycidylization products of hydrogenated bisphenol A, F or A/F;

an N-glycidyl derivative of amides or heterocyclic nitrogen bases, such as triglycidyl cyanurate and triglycidyl isocyanurate, and reaction products of epichlorohydrin and hydantoin.

Aliphatic or cycloaliphatic liquid resins are, for example, commercially available as Araldite® DY-C, Araldite® DY-F, Araldite® DY-H, Araldite® DY-T, Araldite® DY 0397, Araldite® DY 3601 (from Huntsman), D.E.R.® 732, D.E.R.® 736 (from Dow); Heloxy® BD, Heloxy® HD, Heloxy® TP, Epikote® 877 (from Hexion), Beckopox® EP 075 (from Cytec).

In a further embodiment, the polyepoxide E is a polyepoxide which has been prepared from the oxidation of olefins, for example from the oxidation of vinylcyclohexene, dicyclopentadiene, cyclohexadiene, cyclododecadiene, cyclododecatriene, isoprene, 1,5-hexadiene, butadiene, polybutadiene or divinylbenzene.

The polyepoxide E is preferably a diepoxide E1.

The diepoxide E1 is more preferably selected from the group consisting of a bisphenol A, bisphenol F and bisphenol A/F diglycidyl ether having an epoxy equivalent weight of 156 to 250 g/eq, especially Araldite® GY 250, Araldite® PY 304, Araldite® GY 282 (from Huntsman); D.E.R.® 331, D.E.R.® 330 (from Dow); Epikote® 828, Epikote® 862 (from Hexion), N,N-diglycidylaniline and a polyglycol diglycidyl ether having an epoxy equivalent weight of 170 to 340 g/eq, especially D.E.R.® 732 and D.E.R.® 736 (from Dow).

Suitable diketones K1 of the formula (IV) are especially 2,4-pentanedione (=acetylacetone), 3-alkylated 2,4-pentanedione, i.e. especially 3-methyl-, 3-ethyl-, 3-propyl-, 3-isopropyl-, 3-butyl-, 3-tert-butyl-, 3-cyclohexyl- and 3-phenyl-2,4-pentanedione, 1,1,1-trifluoro-2,4-pentanedione, 1,1,1,5,5,5-hexafluoro-2,4-pentanedione, 3,5-heptanedione, 3,5-octanedione, 2,4-octanedione, 6-methyl-3,5-heptanedione, 2,2,6,6-tetramethyl-3,5-heptanedione, 2,2,4,6,6-pentamethyl-3,5-heptanedione, 1-phenyl-1,3-butanedione, 2-acetylcyclopentanone, 2-acetylcyclohexanone, 2-benzoylcyclopentanone and 2-benzoylcyclohexanone.

Preferred diketones K1 are selected from the group consisting of 2,4-pentanedione, 3-methyl-, 3-ethyl-, 3-propyl-, 3-isopropyl-, 3-butyl-, 3-tert-butyl-, 3-cyclohexyl- and 3-phenyl-2,4-pentanedione, 3,5-heptanedione, 6-methyl-3,5-heptanedione, 2,2,6,6-tetramethyl-3,5-heptanedione, 2,2,4,6,6-pentamethyl-3,5-heptanedione, 2-acetylcyclopentanone and 2-acetylcyclohexanone.

A particularly preferred diketone K1 is 2,4-pentanedione.

Suitable diketones K2 of the formula (V) are especially diketones selected from the group consisting of 2,5-hexanedione (=acetonylacetone), 3,4-dimethyl-2,5-hexanedione, 1,2-dibenzoylethane, 1,4-bis(2-furyl)-1,4-butanedione and 2-(2-oxopropyl)cyclopentanone. A preferred diketone K2 is 2,5-hexanedione.

A preferred process for preparing a compound VB of the formula (I) or (II) is characterized in that (α) at least one polyamine A1 having two primary amino groups, (β) at least one amine A2, (γ) at least one diepoxide E1 and (δ) at least one diketone K1 of the formula (IV) or K2 of the formula (V) are reacted with one another in a molar ratio of 1:(0.8 to 1.2):(0.8 to 1.2):(0.8 to 1.2), especially 1:1:1:1, in one of the sequences already described, i.e. via an intermediate of the formula (III), or via an intermediate of the formula (VI) or (VII).

In a first particularly preferred process, at least one polyamine A1 in the form of a polyoxyalkylenediamine, at least one amine A2 and at least one diepoxide E1 are reacted in a molar ratio of 1:(0.8 to 1.2):(0.8 to 1.2), especially 1:1:1, to give an adduct AE, and the latter is subsequently reacted in a molar ratio of 1:(0.8 to 1.2), especially 1:1, with at least one diketone K1 of the formula (IV) or K2 of the formula (V) to give a compound VB of the formula (Ia) or (IIa).

In a second particularly preferred process, at least one polyamine A1 in the form of a polyalkyleneamine and at least one diketone K1 of the formula (IV) or K2 of the formula (V) are reacted in a molar ratio of 1:(0.8 to 1.2), especially 1:1, to give an alkylated polyamine A11, and the latter is subsequently reacted in a molar ratio of 1:(0.8 to 1.2):(0.8 to 1.2), especially 1:1:1, with at least one amine A2 and at least one diepoxide E1 to give a compound VB of the formula (Ib) or (IIb).

It is also possible to initially charge a compound VB of the formula (Ia) or (IIa) and to prepare a compound VB of the formula (Ib) or (IIb) therein—effectively in a solvent. In this way, it is possible in a one-pot process to prepare a mixture of at least one compound VB of the formula (Ia) or (IIa) and at least one compound VB of the formula (Ib) or (IIb).

The compound VB of the formula (I) or (II) is preparable in a simple process from readily available raw materials. It preferably has at least two NH hydrogen atoms which are active toward epoxy groups and at least some of which are in the form of secondary amino groups. Secondary amino groups have formed more particularly from the reaction of primary amino groups with epoxy groups. The compound VB, or the A radical, preferably does not have any primary amino groups. If it nevertheless has primary amino groups, the number thereof is preferably 1 or 2. As a result, it barely reacts, if at all, with carbon dioxide gas from the air and as a result forms a low level of carbonate and/or carbamate salts, if any. The absence of such salt formation is very advantageous especially in the case of use of the compound VB as a hardener for epoxy resins, since this means that there cannot be any salt-related optical and/or mechanical defects in the curing of the epoxy resin, such as more particularly the film opacity known as "blushing". The acylenamino groups of the formula (I) from the reaction with the diketone K1 of the formula (IV)—or the pyrrole groups from the reaction with the diketone K2 of the formula (V)—of the compound VB are stable, even in the presence of water and at elevated temperature, for example at 60° C. Even in the presence of moisture, they do not react to any significant degree with epoxy groups, in spite of the enamine nitrogen in the acylenamino group; the latter is a vinylogous amido group in which the hydrogen atom of the enamine nitrogen can enter into a stable intramolecular hydrogen bond with the carbonyl oxygen.

The compound VB has a comparatively low viscosity for polyepoxide-polyamine adducts.

The compound VB of the formula (I) or (II) can be used as a reactant for substances which have groups reactive toward NH and OH groups. Groups reactive toward NH and OH groups are, for example, isocyanate, isothiocyanate, cyclocarbonate, epoxide, episulfide, aziridine, acryloyl, methacryloyl, 1-ethynylcarbonyl, 1-propynylcarbonyl, maleimide, citraconimide, vinyl, isopropenyl or allyl groups. The compound VB can advantageously be used as a hardener for substances which have at least two of the aforementioned reactive groups, especially as a hardener for polyisocyanates and polyepoxides. The compound VB is especially suitable as a hardener for epoxy resins. The compound VB is advantageously used as a constituent of a mixture which comprises further substances suitable as hardeners for epoxy resins.

The compound VB of the formula (I) or (II) is most suitable as a constituent of a water-dilutable hardener for aqueous epoxy resin dispersions.

The present invention further provides a hardener composition comprising at least one compound VB of the formula (I) or (II), preferably at least one compound VB of the formula (Ia) or (IIa) and at least one compound VB of the formula (Ib) or (IIb), as described above.

A hardener composition comprising at least one compound VB of the formula (Ia) or (IIa) and at least one compound VB of the formula (Ib) or (IIb) is also referred to hereinafter as hardener composition H1.

A hardener composition H1 is of similar composition to the mixture of an emulsifier and a coemulsifier described in EP 0 567 831 A1. The difference from the emulsifier-coemulsifier mixture described in EP 0 567 831 A1 is that the primary amino groups have been converted or capped in another way, namely by means of at least one diketone K1 of the formula (IV) or a diketone K2 of the formula (V) instead of by reductive alkylation by means of aldehyde and formic acid. The capping of primary amino groups by means of reductive alkylation forms secondary amino groups, whereas the reaction with a diketone K1 or K2 caps the primary amino groups such that they no longer have any reactivity toward epoxy groups. Surprisingly, the hardener compositions H1 described, however, are nevertheless just as suitable as hardeners in epoxy resin compositions as the emulsifier-coemulsifier mixtures described in EP 0 567 831 A1. The capping of the primary amino groups by means of a diketone K1 or K2 has a series of advantages over the reductive alkylation described in EP 0 567 831 A1. One is that the reaction with diketone is substantially more rapid, which means a greatly shortened production time for a corresponding water-dilutable hardener. In addition, the reaction with diketone does not form $CO_2$, which can form troublesome carbonate and carbamate salts with primary amino groups, as is the case in the reductive alkylation in EP 0 567 831 A1. The water obtained in the reaction with the diketones K1 or K2 is not disruptive in the case of use as a water-dilatable hardener.

The hardener composition, especially the hardener composition H1, preferably comprises, in addition to at least one compound VB of the formula (I) or (II), (b) at least one adduct AD formed from at least one polyamine A3 having at least two amino groups in the form of primary or secondary amino groups and at least one polyepoxide E having an epoxy equivalent weight (EEW) of 65 to 500 g/eq, where the adduct AD has terminal primary and/or secondary amino groups, (c) optionally at least one polyamine A4 having at least two amino groups in the form of primary or secondary amino groups, and (d) optionally water.

Such a preferred hardener composition is referred to hereinafter as hardener composition H2.

The hardener composition H2 preferably comprises a mixture of a compound VB of the formula (Ia) or (IIa) and a compound VB of the formula (Ib) or (IIb), as described above. Such a mixture can display self-emulsifying action in the hardener composition when mixed with water.

The compound VB of the formula (Ia) or (IIa) is present advantageously in an amount of 0.5 to 1.5 parts by weight, based on 1 part by weight of the compound VB of the formula (Ib) or (IIb).

In addition, an adduct AD is present in the hardener composition H2. In one embodiment, suitable polyamines A3 for preparation of a suitable adduct AD are the same polyamines as already mentioned above as polyamines A1 having at least two primary amino groups. In a further embodiment, suitable polyamines A3 are the same polyamines as already mentioned as amines A2 having one primary and at least one secondary amino group. In a further embodiment, suitable polyamines A3 are polyamines having at least two secondary amino groups, especially N,N'-dibutylethylenediamine; N,N'-di-tert-butylethylenediamine, N,N'-diethyl-1,6-hexanediamine, 1-(1-methylethylamino)-3-(1-methylethylaminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis(4-(N-alkylamino)cyclohexyl)methane, 4,4'-trimethylenedipiperidine, N-alkylated polyetheramines, for example the Jeffamine® products SD-231, SD-401, SD-404 and SD-2001 (from Huntsman).

Preferred polyamines A3 for preparation of an adduct AD are those selected from the group consisting of firstly polyoxyalkylenediamines of the formula (VIII) having a molecular weight of at most 1000 g/mol, preferably Jeffamine® D-230, Jeffamine® D-400, Jeffamine® XTJ-511, Jeffamine® EDR-104, Jeffamine® EDR-148, Jeffamine® EDR-176; Polyetheramine D 230, Polyetheramine D 400, PC Amine® DA 250, PC Amine® DA 400 or PC Amine® DA 650, and secondly isophoronediamine (IPDA), 2,2,4- and 2,4,4-trimethylhexamethylenediamine (TMD), 1,3-xylylenediamine (meta-xylylenediamine or MXDA), 2-butyl-2-ethyl-1,5-pentanediamine (C11-neodiamine), N-ethyl-1,3-propanediamine and N-cyclohexyl-1,3-propanediamine.

Suitable and also preferred polyepoxides E for preparation of a suitable adduct AD are the same polyepoxides as already described for preparation of a compound VB of the formula (I) or (II), especially the diepoxides E1 mentioned.

A particularly suitable adduct AD is the adduct of two moles of polyamine A3 having two amino groups in the form of primary or secondary amino groups and one mole of diepoxide E1.

The adduct AD is present in the hardener composition H2 advantageously in an amount of 0.5 to 1.5 parts by weight, based on 1 part by weight of the compound VB of the formula (I) or (II).

Suitable polyamines A4 are the same polyamines as already mentioned as polyamines A3 for preparation of an adduct AD, and additionally what are known as polyamidoamines. A polyamidoamine is the reaction product of a mono- or polybasic carboxylic acid, or the esters or anhydrides thereof, and an aliphatic, cycloaliphatic or aromatic polyamine, the polyamine being used in a stoichiometric excess. A polybasic carboxylic acid used is typically what is known as a dimer fatty acid, and the polyamine used is typically a polyalkyleneamine, for example TETA. Commercially available polyamidoamines are, for example, Versamid® 100, 125, 140 and 150 (from Cognis), Aradur® 223, 250 and 848 (from Huntsman), Euretek® 3607, Euretek® 530 (from Huntsman), Beckopox® EH 651, EH 654, EH 655, EH 661 and EH 663 (from Cytec).

The polyamine A4 present may be the same polyamine as the polyamine A3 used to prepare an adduct AD, for example by virtue of an excess of polyamine A3 having been used in the reaction with the polyepoxide E, such that unreacted polyamine A3 is still present after the reaction of all epoxy groups.

Preferred polyamines A4 are relatively hydrophobic polyamines, especially selected from the group consisting of isophoronediamine, bis(4-aminocyclo-hexyl)methane, ($H_{12}$-MDA), bis(4-amino-3-methylcyclo-hexyl)methane, 2,2,4- and 2,4,4-trimethylhexa-methylenediamine (TMD), 1,3-xylylenediamine (meta-xylylenediamine or MXDA) and 2-butyl-2-ethyl-1,5-pentanediamine (C11-neodiamine).

The polyamine A4 is present in the hardener composition H2 advantageously in an amount of 0.01 to 0.5 part by weight, based on 1 part by weight of the sum of the compound VB of the formula (I) or (II) and of the adduct AD.

The hardener composition H2 preferably comprises water, especially in an amount of 20 to 90% by weight, based on the overall hardener composition.

The hardener composition H2 more preferably comprises at least one compound VB of the formula (Ia) or (IIa), at least one compound VB of the formula (Ib) or (IIb), at least one adduct AD, at least one polyamine A4 and water.

A hardener composition H2 can be prepared in any desired sequence.

In a preferred preparation process, a one-pot process, at least one compound VB of the formula (I) or (II) is initially charged, and the adduct AD is prepared therein—effectively in a solvent. The adduct AD is advantageously prepared at elevated temperature, for example at a temperature in the range from 60 to 120° C. Subsequently, a polyamine A4 is added to the reaction mixture. And finally, the reaction mixture is diluted with water until the desired solids content is attained, for example a solids content in the range from 10 to 80% by weight.

Compared to a hardening composition as described in EP 0 567 831 A1, the hardener composition described here has the great advantage that the preparation of the compound VB of the formula (I) or (II) is significantly more rapid than the preparation of the emulsifier and coemulsifier described in EP 0 567 831 A1.

The hardener composition H2 may comprise further substances in the form of assistants and additives.

The hardener composition H2 preferably comprises water and has a solids content in the range from 0.10 to 80% by weight. Such a hardener composition is referred to hereinafter as aqueous hardener composition HW.

An aqueous hardener composition HW is in the form of an emulsion. The compound VB of the formula (I) or (II) may have an emulsifying effect, especially when at least one compound VB of the formula (Ia) or (IIa) and at least one compound VB of the formula (Ib) or (IIb) is present. The appearance of the emulsion depends on the fineness of the emulsion droplets. Fine emulsions (microemulsions) are clear or slightly opalescent and typically have the Tyndall effect, whereas coarse emulsions (macroemulsions) have a turbid to milky appearance. Microemulsions have particles which are within the order of magnitude of visible light or smaller. A microemulsion typically has a mean particle size of less than 100 nm.

The aqueous hardener composition HW is preferably present as, a microemulsion within a broad temperature range, especially in the range between 0 and 50° C.

The aqueous hardener composition HW typically has a relatively low viscosity, such that it is easy to handle at room temperature.

A preferred aqueous hardener composition HW comprising, as well as water, at least one compound VB of the formula (Ia) or (IIa), at least one compound VB of the formula (Ib) or (IIb), at least one adduct AD and at least one polyamine A4 is in the form of a thermodynamically stable emulsion and has a clear to slightly turbid appearance. Such an aqueous hardener composition HW can be diluted further by simply stirring water in. Such an aqueous hardener composition is typically storage-stable up to a temperature of 50° C. "Storage-stable" refers to the property that the aqueous hardener composition does not coalesce in the course of storage, i.e. does not exhibit any phase separation, and remains useable in the manner intended. Storage stability up to 50° C. is an important property which is rarely fulfilled by aqueous epoxy hardeners according to the prior art.

One of the hardener compositions described is advantageously used as a constituent of an epoxy resin composition, and acts as a hardener for at least one epoxy resin.

The present invention thus further provides a two- or three-pack epoxy resin composition consisting of a hardener component C1 and a resin component C2 and optionally a further component C3.

The two- or three-pack epoxy resin composition can be used especially as an adhesive, sealing compound, potting compound, coating, floor covering, paint, varnish, primer or undercoat, preferably as a coating, especially as a floor coating.

In a first embodiment, the epoxy resin composition consists of a hardener component C1 and a resin component C2.

The hardener component C1 comprises at least one hardener composition as described above.

The resin component C2 comprises at least one epoxy resin.

Suitable epoxy resins are epoxy resins customary in epoxy chemistry, for example
- a polyepoxide E as already specified above;
- a bisphenol A, F or A/F solid resin which is of similar composition to the liquid resins of the formula (IX) already specified as the polyepoxide E, but instead of the index s has a value of 2 to 12, and also has a glass transition temperature above 25° C.;
- one of the epoxy resins mentioned, which has been modified hydrophilically by the reaction with at least one polyoxyalkylenepolyol.

Preferred epoxy resins are bisphenol A, F or A/F solid or liquid resins, as available commercially, for example, from Dow, Huntsman and Hexion.

The epoxy resin may comprise what is known as a reactive diluent. Suitable reactive diluents are mono- and polyepoxides, for example the glycidyl ethers of mono- or polyhydric phenols and aliphatic or cycloaliphatic alcohols, especially the polyglycidyl ethers of di- or polyols already mentioned as aliphatic or cycloaliphatic polyepoxides E, and additionally especially phenyl glycidyl ether, cresyl glycidyl ether, p-n-butylphenyl glycidyl ether, p-tert-butylphenyl glycidyl ether, nonylphenyl glycidyl ether, allyl glycidyl ether, butyl glycidyl ether, hexyl glycidyl ether, 2-ethylhexyl glycidyl ether, and glycidyl ethers of natural alcohols, for example $C_8$- to $C_{10}$-alkyl glycidyl ethers or $C_{12}$- to $C_{14}$-alkyl glycidyl ethers, commercially available as Erysis® GE-7 and Erysis® GE-8 (from CVC). The addition of a reactive diluent to the epoxy resin causes a reduction in the viscosity and—in the hardened state of the epoxy resin composition—a reduction in the glass transition temperature and in the mechanical values.

When the hardener composition C1 comprises an aqueous hardener composition HW, the resin component C2 preferably comprises either what is known as an "emulsifiable epoxy resin" or an aqueous epoxy resin dispersion. An epoxy resin dispersion preferably comprises, as well as water, at least one epoxy resin as specified above, and additionally at least one emulsifier, especially a nonionic emulsifier, for example an alkyl or alkylaryl polyglycol ether, especially a polyalkoxylated alkylphenol such as alkylphenoxypoly(ethyleneoxy)ethanol, for example a polyadduct formed from nonylphenol and ethylene oxide, containing up to 30 mol of ethylene oxide per mole of nonylphenol.

Commercial epoxy resin dispersions are, for example, Sika® Repair/Sikafloor® EpoCem® Module A (from Sika Schweiz AG), Araldite® PZ 323, Araldite® PZ 756/67, Araldite® PZ 3961 (from Huntsman), XZ 92598.00, XZ 92546.00, XZ 92533.00 (from Dow), Waterpoxy® 1422, Waterpoxy® 1455 (from Cognis), Beckopox® EP 384w, Beckopox® EP 385w, Beckopox® EP 386w, Beckopox® EP 2340w, Beckopox® VEP 2381w (from Cytec).

Epoxy resin dispersions typically have a solids content in the range of 40-65% by weight.

An emulsifiable epoxy resin preferably contains at least one emulsifier as already mentioned above as a constituent of an epoxy resin dispersion.

Commercial emulsifiable epoxy resins are, for example, Araldite® PY 340 and Araldite® PY 340-2 (from Huntsman), Beckopox® 122w and Beckopox® EP 147w (from Cytec).

Both the hardener component C1 and the resin component C2 may comprise further assistants and additives, for example nonreactive diluents, solvents or film-forming assistants, such as toluene, xylene, methyl ethyl ketone, 2-ethoxyethanol, 2-ethoxyethyl acetate or benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, bisphenols and phenol resins, diphenylmethane, diisopropylnaphthalene, mineral oil fractions, for example Solvesso® products (from Exxon), aromatic hydrocarbon resins, sebacates, phthalates, organic phosphoric and sulfonic esters and sulfonamides;

reactive diluents and extenders, for example reactive diluents containing epoxy groups as already mentioned above, epoxidized soybean oil, butyrolactone, triphenyl phosphite, and additionally polyamides, polymers having carboxyl groups, isocyanates, silicones having reactive groups, polysulfides, butadiene-acrylonitrile copolymers and polyurethanes;

polymers, for example polyamides, polysulfides, polyvinyl formal (PVF), polyvinyl butyral (PVB), polyurethanes (PUR), styrene-butadiene copolymers, homo- or copolymers of unsaturated monomers, especially from the group comprising ethylene, propylene, butylene, isobutylene, isoprene, vinyl acetate and alkyl (meth) acrylates, especially chlorosulfonated polyethylenes and fluorinated polymers, sulfonamide-modified melamines;

thermoplastic polymers such as polyether sulfone, polyether imide and bitumen;

inorganic and organic fillers, for example ground or precipitated calcium carbonates, which have optionally been coated with fatty acids, especially stearates, barite (heavy spar), talcs, quartz flours, quartz sand, dolomites, wollastonites, kaolins, mica (potassium aluminum silicate), molecular sieves, aluminum oxides, aluminum hydroxides, silicas, cements, gypsums, fly ashes, carbon black, graphite, metal powders such as aluminum, copper, iron, silver or steel, PVC powders or hollow spheres;

fibers, for example of polymer or glass;

pigments, for example titanium dioxide or iron oxides;

accelerators which accelerate the reaction between amino groups and epoxy groups, for example acids or compounds hydrolyzable to acids, for example organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids, for example phosphoric acid, or mixtures of the aforementioned acids and acid esters; and also tertiary amines such as 1,4-diazabicyclo [2.2.2]octane, benzyldimethylamine, α-methylbenzyldimethylamine, 2-(dimethylaminomethyl)-phenol or 2,4,6-tris(dimethylaminomethyl)phenol, triethanolamine, dimethylaminopropylamine, salts of such tertiary amines, and quaternary ammonium salts, for example benzyltrimethylammonium chloride;

rheology modifiers, such as especially thickeners, for example sheet silicates such as bentonites, derivatives of castor oil, hydrogenated castor oil, polyamides, polyurethanes, urea compounds, fumed silicas, cellulose ethers and hydrophobically modified polyoxyethylenes;

adhesion improvers, for example organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-ureidopropyltrimethoxysilane, 3-chloropropyltrimethoxysilane, vinyltrimethoxysilane, or the corresponding organoalkoxysilanes with ethoxy instead of the methoxy groups;

heat, light or UV stabilizers;

flame-retardant substances;

surface-active substances, for example wetting agents, leveling agents, deaerating agents or defoamers;

biocides, for example algaecides, fungicides or fungal growth inhibitors.

The hardener component C1 and the resin component C2 can each be stored in a suitable package or arrangement, for example a drum, a hobbock, a pouch, a bucket, a canister, a cartridge or a tube, over several months up to a year and longer before use thereof, without the particular properties thereof changing to a degree relevant for the use thereof.

The mixing ratio between the hardener component C1 and the resin component C2 is preferably selected such that the groups reactive toward epoxy groups in the hardener component C1 are in a suitable ratio to the epoxy groups of the resin component C2. Suitably, 0.7 to 1.5 and preferably 0.9 to 1.1 equivalents of NH hydrogens active toward epoxy groups are present before the curing per equivalent of epoxy groups.

In parts by weight, the mixing ratio between the hardener component C1 and the resin component C2 is typically in the range from 1:10 to 10:1.

Before or during the application, the two components are mixed with one another by means of a suitable process. The mixing can be effected continuously or batchwise. If the mixing is effected before the application, it must be ensured that the time which passes between the mixing of the components and the application is not too long, since the result may be defects, for example a slowed or incomplete buildup of the adhesion to the solid surface.

With the mixing, the hardening reaction begins. The NH hydrogens which are reactive toward epoxy groups and are present in the epoxy resin composition react with epoxy groups present, which ultimately cures the composition. The present invention thus also describes a cured composition which is obtained by mixing the components of a two- or three-pack epoxy resin composition as described above.

The application and the hardening are effected advantageously at temperatures in the range from 5 to 50° C.

The hardening proceeds rapidly and completely. The hardening rate depends on the ambient temperature and on any accelerators present. The rate of hardening can be determined by means of a Byk Gardner drying time recorder. This involves pulling a needle over a film applied to a glass strip at a defined speed, and, according to the degree of hardening of the film, a "deep trace" is first drawn into the film, then there is a "film tear", which ultimately becomes a "surface trace" before the film is so dry that the needle no longer leaves any visible trace. "Flow" refers to the moment where the applied composition no longer flows together properly, i.e. the start of the deep trace. "Soft gel" refers to the moment where the film begins to tear. "Hard gel" refers to the moment where the film tear becomes the surface trace, and "cured" refers to the moment where the surface trace disappears and the needle no longer leaves any visible trace.

The hardening of the epoxy resin composition described typically gives rise to clear films with a smooth surface and high shine, which have a high hardness and toughness and excellent adhesion on a wide variety of different substrates.

The epoxy resin composition can be used as an adhesive, sealing compound, potting compound, coating, floor covering, paint, varnish, primer or undercoat, for which important properties may be properties such as watertightness, corrosion protection, chemical resistance and/or high hardness and toughness. They may be used, for example, in construction or civil engineering, in the manufacture or repair of industrial goods or consumer goods.

In a further embodiment, the epoxy resin composition consists of a hardener component C1, a resin component C2 and a further component C3. In this embodiment, the hardener component C1 preferably comprises at least one aqueous hardener composition HW, the resin component C2 preferably comprises at least one epoxy resin dispersion, and the component C3 comprises at least one hydraulically setting mineral substance. Such an epoxy resin composition is also referred to as ECC composition (ECC stands for "epoxy cement concrete").

Suitable hydraulically setting mineral substances are
substances which are referred to conventionally as hydraulic binders and are hardenable with water, even under water, such as lime and especially cement;
latently hydraulic binders which set with water under the action of additives, such as especially blast furnace slag for fly ash;
substances which react with water only under air, known as nonhydraulic binders, such as especially gypsum, Sorel cement, anhydrite, magnesia binders and white lime.

Thus, in the present document, not only cements but especially also calcium sulfate in the form of anhydrite, hemihydrate gypsum or dihydrate gypsum, or blast furnace slags, are referred to as hydraulically setting substances.

The hydraulically setting substance is preferably a cement, especially a cement according to European standard EN 197. Preferred cements are portland cements, sulfoaluminate cements and high-alumina cements, especially portland cement. Mixtures of cements can lead to particularly good properties. Particularly suitable are mixtures of at least one portland cement with either at least one sulfoaluminate cement or with at least one high-alumina cement. For rapid hardening, cementitious quick-setting binders in particular are used, which preferably comprise at least one high-alumina cement or another aluminate source, for example aluminate-donating clinker, and optionally calcium sulfate in the form of anhydrite, hemihydrate or dihydrate gypsum and/or calcium hydroxide.

Component C3 optionally comprises further substances, for example various sand types or quartz flours, fly ash, pigments, and assistants and additives customary in the cement industry, for example plasticizers or setting accelerators or defoamers.

Component C3 of an ECC composition is typically in pulverulent form, whereas the hardener component C1 and the resin component C2 are in liquid form.

An ECC composition is typically used as a high-quality coating or mortar, which are moisture-proof, have good mechanical properties, low shrinkage and good adhesion, especially on moist substrates, for example as a floor covering, barrier layer for sealing from wetness and moisture, as a screed, jointing mortar or tile adhesive, as a leveling, spackling or primer compound, or as a repair mortar. In addition, such ECC compositions are notable for high chemical resistance.

The epoxy resin compositions described are applied to at least one substrate, suitable substrates being the following:
glass, glass ceramic, concrete, mortar, brick, tile, gypsum and natural stone, such as granite or marble;
metals or alloys, such as aluminum, steel, iron, nonferrous metals, galvanized metals;
leather, textiles, paper, wood, resin-bonded woodbase materials, resin-textile composite materials and further polymer composites;
polymers such as polyvinyl chloride (rigid and flexible PVC), acrylonitrile-butadiene-styrene copolymers (ABS), SMC (sheet molding compounds), polycarbonate (PC), polyamide (PA), polyester, poly(methyl methacrylate) (PMMA), polyester, epoxy resins, polyurethanes (PUR), polyoxymethylene (POM), polyolefins (PO), polyethylene (PE) or polypropylene (PP), ethylene/propylene copolymers (EPM) and ethylene-propylene-diene terpolymers (EPDM), and the polymers may preferably be surface-treated by means of plasma, corona or flame;
coated substrates such as powder-coated metals or alloys; and paints and other coating materials.

If required, the substrates may be pretreated before the application of the epoxy resin composition. Such pretreatments include especially physical and/or chemical cleaning processes, for example grinding, sand blasting, shot blasting, brushing or the like, dusts which arise advantageously being removed by suction, and also treatment with detergents or solvents, or the application of an adhesion promoter, of an adhesion promoter solution or of a primer.

EXAMPLES

1. Description of the Test Methods

The viscosity was measured on a Rheotec RC30 cone-plate viscometer (cone diameter 25 mm, cone angle 1°, cone tipplate distance 0.05 mm, shear rate 50 s$^{-1}$). The viscosities measured at 50° C. and at 20° C. were reported, respectively, as "$\eta_{50° C.}$" in Table 1 and as "$\eta_{20° C.}$" in Table 2.

2. Raw Materials Used

| | |
|---|---|
| Jeffamine ® ED-2003 (Huntsman) | Polyoxyalkylenediamine based on propoxylated polyethylene glycol, mean molecular weight = 2000 g/mol |
| Armeen ® CD (Akzo Nobel) | Cocoalkylamine ($C_{12}$ fatty amine), mean molecular weight = 200 g/mol |
| Araldite ® GY 250 (Huntsman) | Bisphenol A diglycidyl ether, EEW = 187 g/eq, mean molecular weight thus approx. 375 g/mol |
| N4-Amine (BASF) | N,N'-Bis(3-aminopropyl)ethylenediamine, molecular weight = 174 g/mol |
| Tetraethylenepentamine (Delamine) ("TEPA") | Technical-grade, molecular weight = 189 g/mol |
| Benzylamine | Molecular weight = 107 g/mol |
| 2,5-Hexanedione (Wacker) | Molecular weight = 114 g/mol |
| 2,4-Pentanedione (Wacker) | Molecular weight = 100 g/mol |
| 2-Ethylhexylamine | Molecular weight = 129 g/mol |
| Dimethylacrylamide | Molecular weight = 99 g/mol |
| Butylene oxide | Molecular weight = 72 g/mol |
| Jeffamine ® D-230 (Huntsman) | Polypropylene glycol diamine, mean molecular weight = 240 g/mol |
| Isophoronediamine (Evonik) ("IPDA") | 1-Amino-3-aminomethyl-3,5,5-trimethylcyclohexane, molecular weight = 170 g/mol |
| meta-Xylylenediamine (Mitsubishi Gas Chem.) ("MXDA") | 1,3-Bis(aminomethyl)benzene, molecular weight = 136 g/mol |

3. Preparation of Hardener Compositions of the H1 Type

Example 1

A round-bottom flask under a nitrogen atmosphere was initially charged with 200.0 g of Jeffamine® ED-2003 and 20.0 g of Armeen® CD at a temperature of 90° C. With good stirring, 37.5 g of Araldite® GY 250 were added slowly, in the course of which it was ensured that the temperature did not rise above 105° C., and the reaction mixture was subsequently stirred further at 90° C. over the course of 2 hours. Then 11.4 g of 2,5-hexanedione were added and stirred in at 90° C. over the course of 15 min. Then 52.2 g of N4-Amine, then a further 34.2 g of 2,5-hexanedione, were added to the reaction mixture and stirred in at 90° C. over the course of 15 min. Then a further 60.0 g of Armeen® CD, then a further 112.5 g of Araldite® GY 250, were added, in the course of which it was ensured that the temperature did not rise above 105° C. Finally, the reaction mixture was stirred at 90° C. for a further 2 hours and then cooled.

A yellowish, waxy material which was solid at room temperature was obtained. The viscosity thereof at 50° C. and the (calculated) NH equivalent weight are reported in Table 1. In the present document, the NH equivalent weight refers to the equivalent weight per hydrogen atom bonded to an amine nitrogen.

Examples 2 to 7 and Comparative Examples 8 and 9

Examples 2 to 7 and comparative example 8 were prepared analogously to example 1, using the ingredients according to the information in Table 1 in the sequence specified. The amounts are reported in grams. In comparative example 8, after the addition of dimethylacrylamide, a reaction time of 1 hour instead of 15 minutes was observed in each case before a further addition. In comparative example 9, after the first addition of butylene oxide, a reaction time of 14 hours at 60° C. instead of 15 minutes at 90° C. was observed, and, after the second addition of butylene oxide, a reaction time of 3 hours at 60° C. and then 90 minutes at 90° C. was observed, before the further addition in each case.

All hardener compositions of examples 1 to 7 and of comparative examples 8 and 9 were in the form of yellowish, solid, waxy materials at room temperature. In the molten state, they were dilutable with water by simple stirring with a spatula to obtain an almost clear liquid in each case. The preparation time of comparative example 9 is significantly longer than the preparation times of the hardener compositions of examples 1 to 7.

TABLE 1

Composition and properties of examples 1 to 7 and of comparative examples 8 and 9

| | Example | | | | | | | | |
|---|---|---|---|---|---|---|---|---|---|
| | 1 | 2 | 3 | 4 | 5 | 6 | 7 | 8 (comp.) | 9 (comp.) |
| Jeffamine ® ED-2003 | 200 | 200 | 200 | 200 | 200 | 200 | 200 | 200 | 200 |
| Armeen ® CD | 20 | 20 | 20 | — | — | 20 | 20 | 20 | 20 |
| Benzylamine | — | — | — | 10.7 | — | — | — | — | — |
| 2-Ethylhexylamine | — | — | — | — | 12.9 | — | — | — | — |
| Araldite ® GY 250 | 37.5 | 37.5 | 37.5 | 37.5 | 37.5 | 37.5 | 37.5 | 37.5 | 37.5 |
| 2,5-Hexanedione | 11.4 | 11.4 | — | 11.4 | 11.4 | 11.4 | — | — | — |
| 2,4-Pentanedione | — | — | 10 | — | — | — | 10 | — | — |
| Dimethylacrylamide | — | — | — | — | — | — | — | 9.9 | — |
| Butylene oxide | — | — | — | — | — | — | — | — | 7.2 |
| N4-Amine | 52.2 | — | 52.2 | 52.2 | 52.2 | 52.2 | 52.2 | 52.2 | 52.2 |
| TEPA | — | 56.7 | — | — | — | — | — | — | — |
| 2,5-Hexanedione | 34.2 | 34.2 | — | 34.2 | 34.2 | — | 34.2 | — | — |
| 2,4-Pentanedione | — | — | 30 | — | — | 30 | — | — | — |
| Dimethylacrylamide | — | — | — | — | — | — | — | 29.7 | — |
| Butylene oxide | — | — | — | — | — | — | — | — | 21.6 |
| Armeen ® CD | 60 | 60 | 60 | — | — | 60 | 60 | 60 | 60 |
| Benzylamine | — | — | — | 32.1 | — | — | — | — | — |
| 2-Ethylhexylamine | — | — | — | — | 38.7 | — | — | — | — |

TABLE 1-continued

Composition and properties of examples 1 to 7 and of comparative examples 8 and 9

| | Example | | | | | | | | |
|---|---|---|---|---|---|---|---|---|---|
| | 1 | 2 | 3 | 4 | 5 | 6 | 7 | 8 (comp.) | 9 (comp.) |
| Araldite ® GY 250 | 112.5 | 112.5 | 112.5 | 112.5 | 112.5 | 112.5 | 112.5 | 112.5 | 112.5 |
| $\eta_{50°\,C.}$ [Pa · s] | 6 | 9 | 6 | 16 | 8 | 4 | 4 | 11 | 11 |
| NH eq. wt. [g/eq] | 377 | 313 | 373 | 350 | 357 | 374 | 376 | 290 | 284 |

4. Production of Hardener Compositions of the H2 or HW Type

Example 10

A round-bottom flask under a nitrogen atmosphere was initially charged with 200 g of the hardener composition from example 1, to which 126.5 g of Jeffamine® D-230 were added, and the reaction mixture was heated to 90° C. while stirring. Then, with good stirring, 98.5 g of Araldite® GY 250 were added gradually, in the course of which it was ensured that the temperature did not rise above 105° C. Finally, the reaction mixture was stirred at 90° C. for a further 90 min, then 75 g of isophoronediamine and 489.1 g of water were stirred in successively, and the mixture was cooled.

A yellowish, clear liquid was obtained. The viscosity at 20° C., the (calculated) NH equivalent weight, the water content (incl. water formed, in % by weight) and the storage stability at 50° C. are reported in Table 2.

Examples 11 to 17 and Comparative Examples 18 and 19

Examples 11 to 17 and comparative examples 18 and 19 were prepared analogously to example 10, using the ingredients according to the information in Table 2. The amounts are reported in grams.

In all examples apart from comparative examples 18 and 19, a clear liquid was obtained in each case. The appearance was assessed visually and reported in Table 2.

For the assessment of storage stability ("storage stab$_{50°\,C.}$"), the hardener compositions were heated to 50° C. over the course of 4 weeks. When no coalescence occurred within this time, the composition was designated stable or "ok", and otherwise as unstable or "no".

TABLE 2

Composition and properties of examples 10 to 17 and of comparative examples 18 and 19

| | Example | | | | | | | | | |
|---|---|---|---|---|---|---|---|---|---|---|
| | 10 | 11 | 12 | 13 | 14 | 15 | 16 | 17 | 18 (comp.) | 19 (comp.) |
| Amount [g] | 200 | 200 | 200 | 200 | 200 | 200 | 200 | 200 | 200 | 200 |
| Example | 1 | 1 | 2 | 3 | 4 | 5 | 6 | 7 | 8 | 9 |
| Jeffamine ® D230 | 126.5 | 126.5 | 126.5 | 126.5 | 126.5 | 126.5 | 126.5 | 126.5 | 126.5 | 126.5 |
| Araldite ® GY 250 | 98.5 | 98.5 | 98.5 | 98.5 | 98.5 | 98.5 | 98.5 | 98.5 | 98.5 | 98.5 |
| IPDA | 75 | — | 75 | 75 | 75 | 75 | 75 | 75 | 75 | 75 |
| MXDA | — | 59.8 | — | — | — | — | — | — | — | — |
| Water | 489.1 | 473.9 | 489.1 | 494.5 | 488.3 | 488.5 | 493.1 | 490.4 | 500 | 500 |
| Water content | 50 | 50 | 50 | 50 | 50 | 50 | 50 | 50 | 50 | 50 |
| Appearance | Yellow clear | Yellow clear | Yellow clear | Yellow clear | Yellow clear | Yellow clear | Yellow clear | Yellow clear | Milky | Slightly turbid |
| $\eta_{20°\,C.}$ [Pa · s] | 35 | 73 | 30 | 16 | 9 | 10 | 18 | 25 | 20 | 30 |
| Storage stab$_{50°\,C.}$ | ok | ok | ok | ok | ok | ok | ok | ok | no | ok |
| NH eq. [g/eq] | 256 | 248 | 249 | 257 | 253 | 254 | 256.5 | 256 | 248 | 247.5 |

5. Production of Epoxy Resin Compositions

Examples 20 to 27 and Comparative Examples 28 and 29

The hardener compositions of the H2 or HW type from examples 10 to 17 and the hardener compositions from comparative examples 18 and 19 were mixed in the proportions by weight specified in Table 3 with 50 parts by weight of the epoxy resin dispersion Sika® Repair/Sikafloor® EpoCem® Module A (EEW=288.7 g/eq, solids content=62% by weight; Sika Schweiz AG). For each mixed composition, a film with a layer thickness of 76 μm was drawn down onto a glass plate, and a film with a layer thickness of 500 μm onto a further glass plate.

The following tests were carried out thereon:

The hardening rate was determined on a freshly applied film in a layer thickness of 76 μm on glass by means of a BYK-Gardner drying time recorder (Beck-Koller method): in Table 3, the start of the deep trace ("flow") was designated "$t_{flow}$", the start of film tearing ("soft gel") "$t_{soft\,gel}$", the start of the surface trace ("hard gel") "$t_{hard\,gel}$", and the end of the surface trace ("cured") "$t_{cured}$".

The hardness was determined as the Buchholz hardness on a film drawn down onto a glass plate in a layer thickness of 500 μm, after a hardening time of 30 days at 23° C. and 50% relative humidity (r.H.), by means of a PIG universal instrument from Byk-Gardner.

The adhesion was determined on glass on a film drawn down onto a glass plate in a layer thickness of 500 μm. To test the adhesion, the film was repeatedly incited down to the glass plate with a blade, and attempts were made to detach the film from the glass plate with the blade. If this was impossible, the adhesion was designated "good".

The appearance was assessed on two films each on glass with layer thicknesses of 76 μm and 500 μm, and designated in Table 3 as appearance (76 μm) and as appearance (500 μm). The appearances were designated clear ("clear"), hazy ("hazy"), impeccable ("imp.") and structured ("struc."). Impeccable films are considered to be those which are clear, shiny and tack-free, and have no surface structure whatsoever. Structured films are considered to be those whose surface is not completely smooth but has a slight orange-like skin.

The results of the tests are reported in Table 3.

TABLE 3

Composition and properties of examples 20 to 27 and of comparative examples 28 and 29

| | Example | | | | | | | | | |
|---|---|---|---|---|---|---|---|---|---|---|
| | 20 | 21 | 22 | 23 | 24 | 25 | 26 | 27 | 28 (comp.) | 29 (comp.) |
| Amount Example | 44.3 10 | 44.0 11 | 43.3 12 | 44.3 13 | 44.0 14 | 44.3 15 | 44.3 16 | 44.3 17 | 43.6 18 | 42.6 19 |
| $t_{flow}$ [h] | 4 | 3.5 | 2.5 | 3 | 2.5 | 1.2 | 3.8 | 4 | n.d. | 2.2 |
| $t_{soft\,gel}$ [h] | 5 | 4.5 | 3.3 | 3.7 | 3 | 1.7 | 4.4 | 4.9 | 4 | 3 |
| $t_{hard\,gel}$ [h] | 8.6 | 7.7 | 9 | 7.7 | 7.1 | 8.4 | 9.7 | 10.2 | 10 | 5.6 |
| $t_{cured}$ [h] | 13.8 | 10.8 | 13 | 12.8 | 12.5 | 12.7 | 13.8 | 14.3 | >24 | 12 |
| Appearance (76 μm) | clear, imp. | clear, imp. | clear, imp. | clear, imp. | clear, imp. | clear, imp. | clear, imp. | clear, imp. | hazy, struc. | clear, imp. |
| Appearance (500 μm) | clear, imp. | almost clear, imp. | clear, imp. | clear, imp. | clear, imp. | clear, imp. | clear, imp. | clear, imp. | hazy | clear, imp. |
| Hardness | 100 | 100 | 100 | 111 | 111 | 111 | 100 | 100 | 95 | 100 |
| Adhesion | good | no | good | good | good | good | good | good | good | good |

6. Preparation of ECC Compositions

Example 30

7.2 parts by weight of the hardener composition from example 10 were mixed with 17.6 parts by weight of water and 0.19 part by weight of defoamer (BYK®-023, BYK-Chemie) (=hardener component). To this were added 10 parts by weight of Sika® Repair/Sikafloor® EpoCem® Module A (EEW=288.7 g/eq, solids content=62% by weight; Sika Schweiz AG) (=resin component) and 150 parts by weight of Sikafloor®-81 EpoCem® component C (Sika Schweiz AG) (=cementitious powder), and everything was mixed thoroughly. The ECC composition obtained was used to determine the solidification time to EN 480-2, the slump to EN 1015-3 and the compressive strength and the flexural tensile strength on prisms of dimensions 40×40×160 mm to EN 13892-2, the tensile adhesive strength to EN 13892-8 and the shrinkage (change in length) of prisms of dimensions 40×40×160 mm to DIN 52450 after storage under standard climatic conditions (23° C., 50% relative humidity) for different durations. The results are reported in Table 4.

Example 31

In the same way as described for example 30, the hardener composition from example 13 was used to produce an ECC mortar, and it was tested. The results are reported in Table 4.

TABLE 4

Properties of examples 30 and 31
(SCC = standard climatic conditions).

| Example | 30 | 31 |
|---|---|---|
| Solidification time (start/end) [h] | 6.5/8.8 | 6.8/10 |
| Slump (20 min, 23° C.) | 353 mm | 346 mm |
| Processability on concrete | very good | very good |
| Assessment of the surface on concrete base after 1 d of SCC | regular, no cracks | regular, no cracks |
| Compressive strength | | |
| after 1 d of SCC | 27.7 MPa | 23.0 MPa |
| after 7 d of SCC | 57.9 MPa | 54.3 MPa |
| after 28 d of SCC | 66.5 MPa | 62.3 MPa |

TABLE 4-continued

Properties of examples 30 and 31
(SCC = standard climatic conditions).

| Example | 30 | 31 |
|---|---|---|
| Flexural tensile strength | | |
| after 1 d of SCC | 5.7 MPa | 4.8 MPa |
| after 7 d of SCC | 11.3 MPa | 8.7 MPa |
| after 28 d of SCC | 15.6 MPa | 11.9 MPa |
| Shrinkage | | |
| after 1 d of SCC | −1.30% | −0.950% |
| after 7 d of SCC | −1.80% | −1.307% |
| after 28 d of SCC | −2.24% | −1.660% |
| Tensile bond after 28 d of SCC | 4.1 MPa | 3.4 MPa |
| Fracture | 100% concrete fracture | 100% concrete fracture |

The ECC compositions of examples 30 and 31 have exceptionally good processability, have very good mechanical properties and harden with impeccable surface appearance.

The invention claimed is:

1. A compound VB of formula (I) or (II):

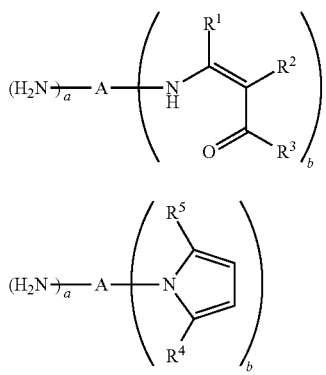

where

R$^1$ and R$^3$ are each independently an alkyl, cycloalkyl, aryl or arylalkyl group which has 1 to 12 carbon atoms and optionally has ether groups or halogen atoms, and R$^2$ is a hydrogen atom or an alkyl, cycloalkyl, aryl or arylalkyl group having 1 to 12 carbon atoms, or R$^2$ and R$^1$ together are a divalent hydrocarbon radical which is part of an optionally substituted carbocyclic ring having 5 to 8 carbon atoms, and R$^3$ is an alkyl, cycloalkyl, aryl or arylalkyl group which has 1 to 12 carbon atoms and optionally has ether groups or halogen atoms;

or

R$^2$ and R$^3$ together are a divalent hydrocarbon radical which is part of an optionally substituted carbocyclic ring having 5 to 8 carbon atoms, and R$^1$ is an alkyl, cycloalkyl, aryl or arylalkyl group which has 1 to 12 carbon atoms and optionally has ether groups or halogen atoms;

R$^4$ and R$^5$ are each independently an alkyl, cycloalkyl, aryl or arylalkyl group which has 1 to 12 carbon atoms and optionally has ether groups or halogen atoms;

A is an (a+b)-valent radical of a polyamine-polyepoxide adduct after removal of (a+b) terminal primary amino groups, wherein the polyamine is at least one polyamine A1 selected from the group consisting of: a polyalkyleneamine having terminal primary amino groups and at least one secondary amino group per molecule; and an ether-containing diamine of formula (VIII):

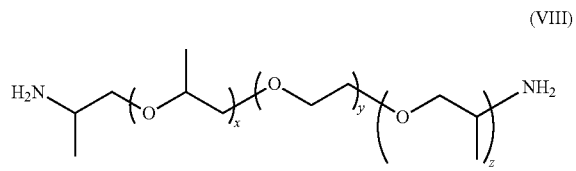

wherein x is an integer from 0 to 50, y is an integer from 0 to 100, z is an integer from 1 to 50, and (x+z) is an integer from 1 to 100;

a is an integer from 0 to 4; and b is an integer from 1 to 4;

with the provisos that the sum of a and b is an integer from 1 to 4, and that the parent polyepoxide of the polyamine-polyepoxide adduct is at least one polyepoxide E having an epoxy equivalent weight (EEW) of 65 to 500 g/eq.

2. A compound VB of the formula (I) as claimed in claim 1, wherein it has formula (Ia) or (Ib):

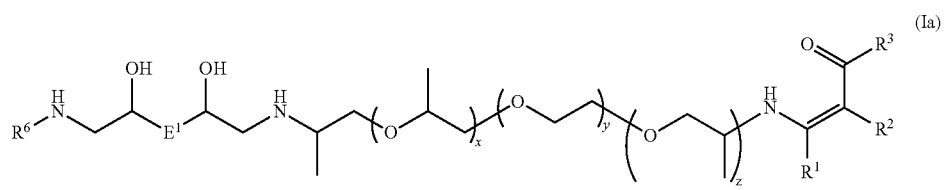

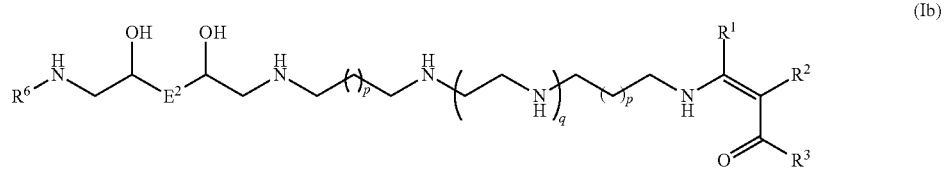

or where

R$^6$ is an alkyl or cycloalkyl or arylalkyl group which optionally has ether or secondary amino groups;

E$^1$ and E$^2$ are each independently the remainder of a diepoxide E1 having an epoxy equivalent weight (EEW) of 65 to 500 g/eq, after removal of two epoxy groups;

x is an integer from 0 to 50;

y is an integer from 0 to 100;

z is an integer from 1 to 50;

(x+z) is an integer from 1 to 100;

p is 0 or 1; and q is 0, 1, 2 or 3.

3. A compound VB of the formula (II) as claimed in claim 1, wherein it has formula (IIa) or (IIb):

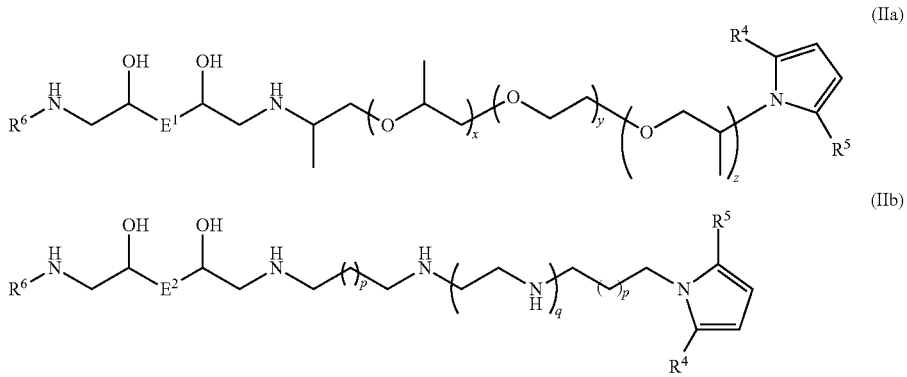

where
R⁶ is an alkyl or cycloalkyl or arylalkyl group which optionally has ether or secondary amino groups;
E¹ and E² are each independently the remainder of a diepoxide E1 having an epoxy equivalent weight (EEW) of 65 to 500 g/eq, after removal of two epoxy groups;
x is an integer from 0 to 50;
y is an integer from 0 to 100;
z is an integer from 1 to 50;
(x+z) is an integer from 1 to 100;
p is 0 or 1; and
q is 0, 1, 2 or 3.

4. A compound VB of the formula (I) or (II) as claimed in claim 1, wherein the at least one diepoxide E is selected from the group consisting of a diglycidyl ether of bisphenol A, bisphenol F or bisphenol A/F, each having an epoxy equivalent weight of 156 to 250 g/eq, N,N-diglycidylaniline, and a polyglycol diglycidyl ether having an epoxy equivalent weight of 170 to 340 g/eq.

5. A process for preparing a compound VB of the formula (I) or (II) as claimed in claim 1, wherein:
(α) the at least one polyamine A1,
(β) optionally at least one amine A2 containing only one primary amino group,
(γ) the at least one polyepoxide E, and
(δ) at least one diketone K1 of the formula (IV) or K2 of the formula (V)

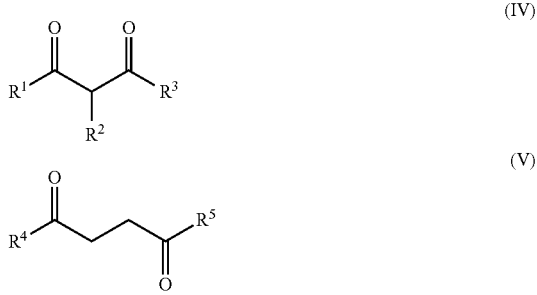

are reacted with one another over more than one stage, where a ratio between the number of primary amino groups and epoxy groups is in a range from 1.25 to 2.0,
and where the at least one diketone K1 or K2 is used in a ratio to the primary amino groups, which are in excess in relation to the epoxy groups, in an amount of from 0.25 to 1.0 equivalent.

6. The process as claimed in claim 5, wherein the at least one diketone K1 or K2 is selected from the group consisting of 2,4-pentanedione, 3-methyl-2,4-pentanedione, 3-ethyl-2,4-pentanedione, 3-propyl-2,4-pentanedione, 3-isopropyl-2,4-pentanedione, 3-butyl-2,4-pentanedione, 3-tert-butyl-2,4-pentanedione, 3-cyclohexyl-2,4-pentanedione, 3-phenyl-2,4-pentanedione, 3,5-heptanedione, 6-methyl-3,5-heptanedione, 2,2,6,6-tetramethyl-3,5-heptanedione, 2,2,4,6,6-pentamethyl-3,5-heptanedione, 2-acetylcyclopentanone, and 2-acetylcyclohexanone.

7. The process as claimed in claim 5, wherein the at least one polyamine A1 is selected from the group consisting of ether-containing diamines of the formula (VIII), diethylenetriamine (DETA), triethylenetetramine (TETA), tetraethylenepentamine (TEPA), pentaethylenehexamine (PEHA), polyethylenepolyamine having 5 to 7 ethyleneamine units (HEPA), 3-(2-aminoethyl)aminopropylamine (N-3-amine), and N,N'-bis(3-aminopropyl)ethylenediamine (N-4-amine).

8. The process as claimed in claim 5, wherein the at least one amine A2 is selected from the group consisting of butylamine, pentylamine, hexylamine, cyclohexylamine, octylamine, decylamine, dodecylamine, tetradecylamine, hexadecylamine, octadecylamine, eicosylamine, docosylamine, 2-ethyl-1-hexylamine, benzylamine, 1-phenylethylamine, 2-phenylethylamine, N-hexyl-1,2-ethanediamine, N-(2-ethylhexyl)-1,2-ethanediamine, N-cyclohexyl-1,2-ethanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, cocoalkylamine, soyaalkylamine, oleylamine, N-cocoalkyl-1,3-propanediamine, N-oleyl-1,3-propanediamine, and N-soyaalkyl-1,3-propanediamine.

9. The process as claimed in claim 5, wherein the at least one polyepoxide E is selected from the group consisting of a diglycidyl ether of bisphenol A, bisphenol F or bisphenol A/F, each having an epoxy equivalent weight of 156 to 250 g/eq, N,N-diglycidylaniline, and a polyglycol diglycidyl ether having an epoxy equivalent weight of 170 to 340 g/eq.

10. A hardener composition comprising: (a) at least one compound VB of the formula (I) or (II) as claimed in claim 1.

11. The hardener composition as claimed in claim 10, wherein the at least one compound VB of the formula (I) or (II) has formula (Ia), (IIa), (Ib) or (IIb):

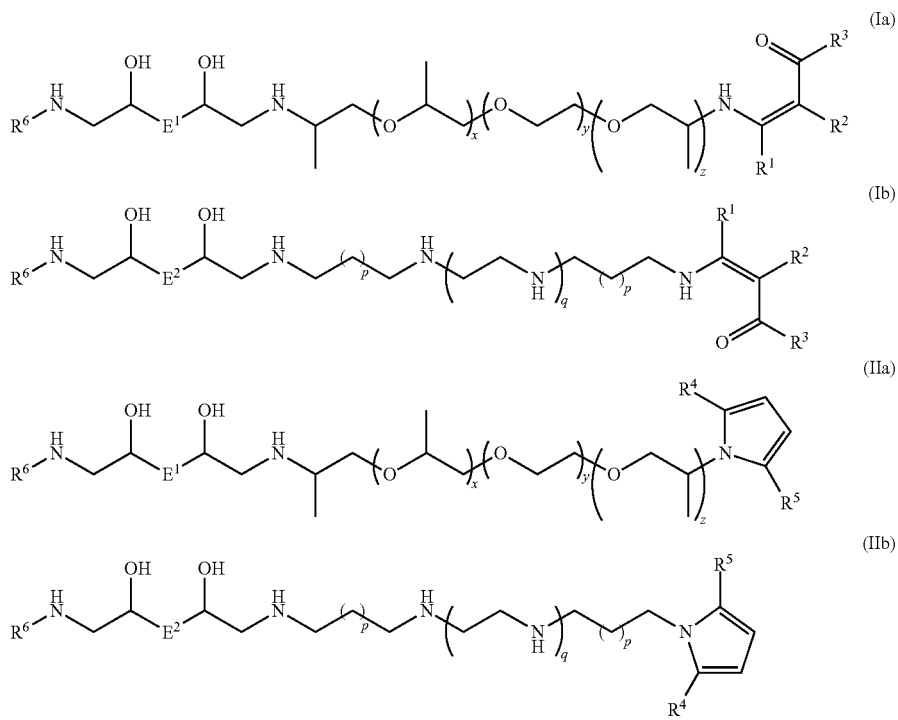

where
R⁶ is an alkyl or cycloalkyl or arylalkyl group which optionally has ether or secondary amino groups;
E¹ and E² are each independently the remainder of a diepoxide E1 having an epoxy equivalent weight (EEW) of 65 to 500 g/eq, after removal of two epoxy groups;
x is an integer from 0 to 50;
y is an integer from 0 to 100;
z is an integer from 1 to 50;
(x+z) is an integer from 1 to 100;
p is 0 or 1; and
q is 0, 1, 2 or 3.

12. The hardener composition as claimed in claim 10, further comprising:
(b) at least one adduct AD formed from at least one polyamine A3 having at least two amino groups in the form of primary or secondary amino groups and at least one polyepoxide E having an epoxy equivalent weight (EEW) of 65 to 500 g/eq, where the adduct AD has terminal primary and/or secondary amino groups,
(c) optionally at least one polyamine A4 having at least two amino groups in the form of primary or secondary amino groups, and
(d) optionally water.

13. The hardener composition as claimed in claim 12, wherein the at least one polyamine A3 is selected from the group consisting of polyoxyalkylenediamines having a molecular weight of at most 1000 g/mol, isophoronediamine (IPDA), 2,2,4-trimethylhexamethylenediamine (TMD), 2,4,4-trimethylhexamethylenediamine (TMD), 1,3-xylylenediamine (MXDA), 2-butyl-2-ethyl-1,5-pentanediamine (C11-neodiamine), N-ethyl-1,3-propanediamine, and N-cyclohexyl-1,3-propanediamine.

14. The hardener composition as claimed in claim 12, wherein the at least one polyamine A4 is selected from the group consisting of isophoronediamine (IPDA), bis(4-aminocyclohexyl)methane (H₁₂-MDA), bis(4-amino-3-methylcyclohexyl)methane, 2,2,4-trimetheylhexamethylenediamine (TMD), 2,4,4-trimethylhexamethylenediamine (TMD), 1,3-xylylenediamine (MXDA), and 2-butyl-2-ethyl-1,5-pentanediamine (C11-neodiamine).

15. The hardener composition as claimed in claim 12, wherein the composition contains water.

16. A two-pack or three-pack epoxy resin composition consisting of a hardener component C1 and a resin component C2 and optionally a further component C3, wherein:
the hardener component C1 comprises at least one hardener composition as claimed in claim 10;
the resin component C2 comprises at least one epoxy resin; and
the component C3 comprises at least one hydraulically setting mineral substance.

17. A hardened composition which is obtained by mixing the components of the two-pack or three-pack epoxy resin composition of claim 16.

18. A method of obtaining a hardened composition, the method comprising: mixing at least one compound VB of the formula (I) or (II) as claimed in claim 1 with a substance that has at least two groups reactive toward NH and OH groups and selected from the group consisting of isocyanate, isothiocyanate, cyclocarbonate, epoxide, episulfide, aziridine, acryloyl, methacryloyl, 1-ethynylcarbonyl, 1-propynylcarbonyl, maleimide, citraconimide, vinyl, isopropenyl and allyl groups.

19. A floor coating composition comprising the two-pack or three-pack epoxy resin composition of claim 16.

* * * * *